(12) United States Patent
Rudys et al.

(10) Patent No.: US 10,220,900 B2
(45) Date of Patent: Mar. 5, 2019

(54) COMPACT LAMP

(71) Applicant: VILNIUS UNIVERSITY, Vilnius (LT)

(72) Inventors: Saulius Rudys, Vilnius (LT); Juras Banys, Vilnius (LT); Robertas Grigalaitis, Vilnius (LT)

(73) Assignee: VILNIUS UNIVERSITY, Vilnius (LT)

( * ) Notice: Subject to any disclaimer, the term of this patent is extended or adjusted under 35 U.S.C. 154(b) by 0 days.

(21) Appl. No.: 15/572,264

(22) PCT Filed: Apr. 29, 2016

(86) PCT No.: PCT/IB2016/052439
§ 371 (c)(1),
(2) Date: Nov. 7, 2017

(87) PCT Pub. No.: WO2016/181250
PCT Pub. Date: Nov. 17, 2016

(65) Prior Publication Data
US 2018/0134335 A1    May 17, 2018

(30) Foreign Application Priority Data
May 8, 2015   (LT) ...................................... 2015 037

(51) Int. Cl.
*B62J 6/00* (2006.01)
*B62J 6/02* (2006.01)
(Continued)

(52) U.S. Cl.
CPC ................. *B62J 6/005* (2013.01); *B62J 6/00* (2013.01); *B62J 6/02* (2013.01); *B62J 6/16* (2013.01); *B62K 21/12* (2013.01); *F21S 41/141* (2018.01)

(58) Field of Classification Search
CPC ..... B62J 6/005; B62J 6/02; B62J 6/16; B62K 21/12; F21S 41/141
(Continued)

(56) References Cited

U.S. PATENT DOCUMENTS

| 2,603,701 A | 7/1952 | Schadel |
| 4,875,142 A * | 10/1989 | Spector .................... B62J 6/005 |
| | | 362/202 |

(Continued)

FOREIGN PATENT DOCUMENTS

| EP | 2 184 531 A1 | 5/2010 |
| EP | 2 319 748 A1 | 5/2011 |

(Continued)

OTHER PUBLICATIONS

International Search Report, dated Jul. 5, 2016, from corresponding PCT/IB2016/052439 application.

*Primary Examiner* — John A Tweel, Jr.
(74) *Attorney, Agent, or Firm* — Young & Thompson

(57) ABSTRACT

The compact lamp consists of a light source, a focusing lens, a specially shaped secondary lens with a saddle-shaped output surface, a light transmitting element, a battery holding chamber with an electrical control circuit connected to a button for control of the lamp source via a magnetic contact. Some of these elements are placed inside the lamp housing, mounted on an end of a handlebar or another suitable lighting device, and some other elements, including the battery and the magnetic control circuit, are installed inside the handlebar tube or the housing of the lighting device. The compact optical layout enables a beam, which is sharply limited in the vertical plane and sufficiently wide in the horizontal plane and is suitable for daytime running lamps, night headlamps or position lights. When at least two light (Continued)

sources are used in one lamp, beams of different light dispersion patterns can be electrically toggled.

17 Claims, 5 Drawing Sheets

(51) Int. Cl.
   *B62K 21/12* (2006.01)
   *F21S 41/141* (2018.01)
   *B62J 6/16* (2006.01)
(58) Field of Classification Search
   USPC .......................................................... 340/475
   See application file for complete search history.

(56) References Cited

U.S. PATENT DOCUMENTS

| | | | |
|---|---|---|---|
| 5,247,431 A * | 9/1993 | Liu .......................... | B62J 6/005 |
| | | | 362/474 |
| 7,377,673 B1 * | 5/2008 | Hsiao ........................ | B62J 6/00 |
| | | | 362/190 |
| 7,481,560 B1 * | 1/2009 | Jaw .......................... | B62J 6/005 |
| | | | 16/421 |
| 7,891,849 B2 * | 2/2011 | Campbell .................. | B62J 6/00 |
| | | | 362/473 |
| 2003/0215766 A1 | 11/2003 | Fisher et al. | |
| 2004/0170014 A1 | 9/2004 | Pritchard et al. | |

FOREIGN PATENT DOCUMENTS

| KR | 101406282 B1 | 6/2014 |
|---|---|---|
| WO | 2005035345 A1 | 4/2005 |

* cited by examiner

COMPACT LAMP

FIELD OF THE INVENTION

The invention relates to lighting devices mounted on vehicles, and more specifically to lighting and signaling devices mounted on a handlebar.

BACKGROUND OF THE INVENTION

A variety of lighting devices are mounted on bicycles for signaling and for illumination of the bicycle and the cyclist. Normally, a lighting device includes one or more LED lamps installed in a housing with a power source. Usually, the devices are mounted on the central area of bicycle parts, such as the steering wheel, the seat rod, etc., which makes it difficult to judge the dimensions of an approaching bicycle at night. Moreover, estimation of the distance is also encumbered, since usually only one lamp is used. LED lamps feature an intensive directional beam, which could dazzle a person in front. In order to eliminate glare at night, it is desirable to sharply limit the beam vertically. This is not possible using reflector lamps. It can be achieved using lens lamps, but they usually are characterized by a narrow symmetrical beam or are less efficient. Higher power (approximately 30 lm) bicycle lamps are rather unwieldy and usually consist of two parts connected by a wire: a lamp and a battery.

There are known lighting devices for mounting into the bicycle handlebar. European patent application No. 08019563.9 disclosed a warning lamp mounted on an end of a bicycle handlebar. Such a lamp consists of a holder mounted on a handlebar end, a light-emitting diode, a lens and a reflector. The main drawback of this lighting device design is that the application is limited only to position indication and it cannot be used for daytime running lamps or headlamps at night.

The international patent applications PCT/EP2004/011465 and the European patent application No. 10190046.2 describe various methods for installation of a bicycle lighting system in different locations of a handlebar, where the lighting devices act as position lights or as route illumination equipment. According to the first application, the strength of the handlebar is severely reduced, since large holes in the handlebar are required, and the lamps are not provided with means to optimize the beam dissipation. According to the second application, the lamps are integrated into auxiliary handles, which sometime are superfluous, and are not provided with means to optimize the beam dissipation.

The closest analog is disclosed in the Korean patent No. KR101406282 (B1). The bicycle lamp is mounted on an end of a bicycle handlebar and includes an handlebar-inserted lamp housing, a power supply, lighting controls and multiple LEDs. Although this device can perform several types of lighting functions, such as indication of turns and illumination of the cycling route, light from the LEDs is dispersed equally in all directions of the vertical plane perpendicular to the handlebar. If LEDs are directed only in the direction of the route, their flux density is insufficient for cycling route illumination or daytime running lights.

The proposed lamp eliminates the drawbacks of all said devices, while maintaining the compact size and versatility. The main advantage of the lamp is utilization of several distinct lenses for focusing of LED emitted light beam in the vertical and the horizontal planes.

BRIEF DESCRIPTION OF THE INVENTION

The compact flat optical layout of the lamp comprises a light source, a focusing lens, a narrow lens with saddle-shaped, cylindrical or convex surface, and at least one optical fiber rod. All these elements are installed in the housing at a handlebar end. The hollow of the handlebar tube is used for placement of: a battery holding chamber with an electrical control circuit that includes a magnetic switch, which is coupled to a magnetic button via magnetic field, where the magnetic button is used for control of the lamp light source. The lamp extends a standard handlebar tip only by 8-12 mm. The compact optical layout allows obtaining a beam, which is sharply limited in the vertical plane and sufficiently wide in the horizontal plane, suitable for daytime running lamps, night headlamps or position lights. When at least two light sources are used in one lamp, beams of different light dispersion patterns can be electrically toggled.

BRIEF DESCRIPTION OF THE DRAWINGS

Other features and advantages of the invention are disclosed in the detailed description of the invention with reference to the following drawings.

Before presenting the detailed description of the invention with reference to the embodiment drawings, we must note that identical elements are indicated by the same numerals in all drawings.

DETAILED DESCRIPTION OF THE INVENTION

Figure 1:
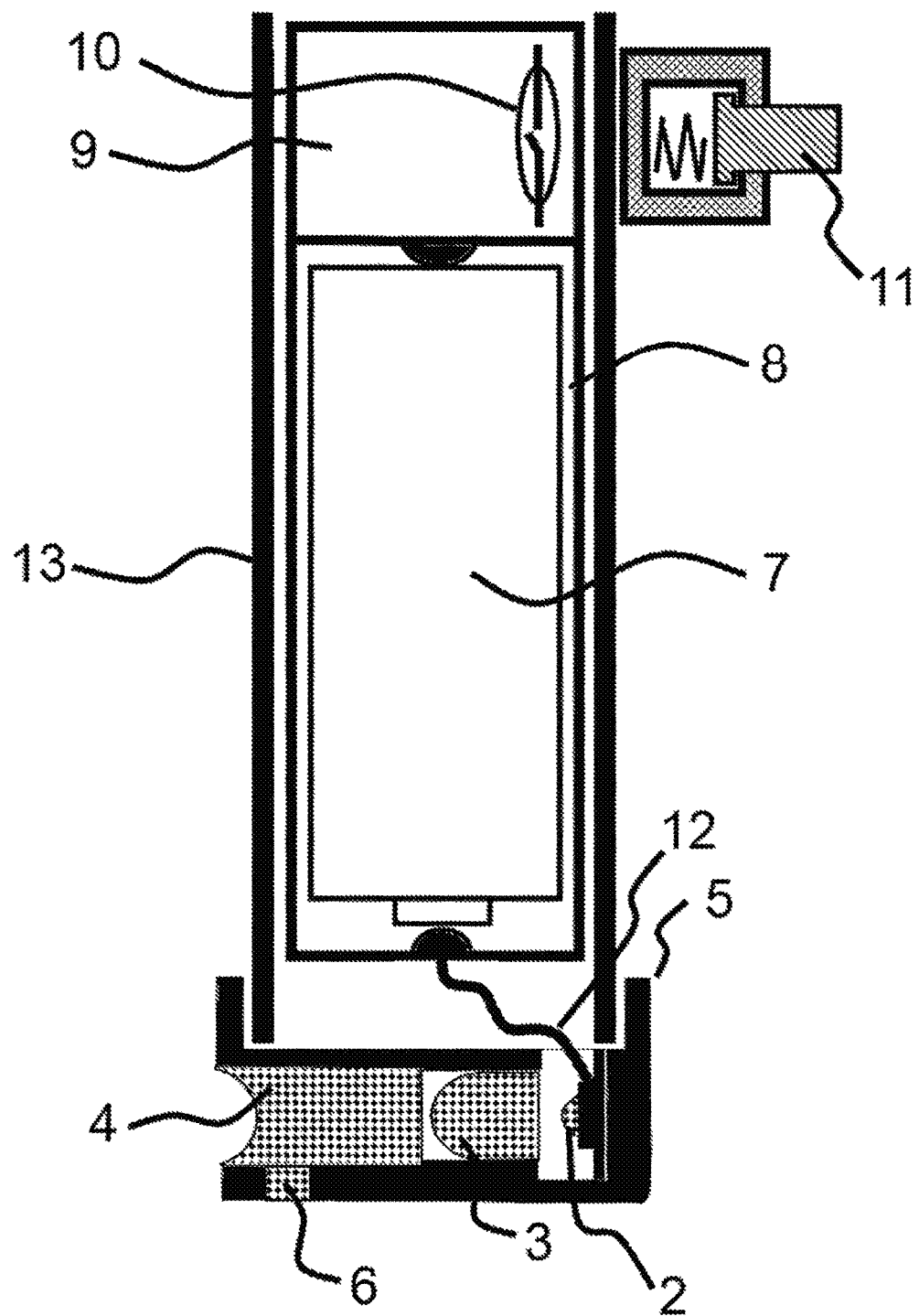
FIG. 1 presents the lamp.

A compact flat lamp (1) comprising a light source (2), such as a LED, a focusing lens (3), a special lens (4) with concave-convex saddle-shaped surface, an additional light-transmitting element (6) for additional light output from the housing (5) to the outside, a battery (7) in a chamber (8), a control circuit (9), which is coupled via a magnetic contact (10) to the button (11) and is used for control of the lamp (1) light source (2). If a narrower light beam is required, the outer surface of the special lens (4) may be cylindrical or convex. Some lamp elements, specifically the light source (2) and the lenses (3, 4), are installed in the housing (5), which is mounted on an end of a handlebar tube (13), and some other elements such as the battery 7) and its chamber (8), the electric control circuit (9), the magnetic contact (10) and the leads (12) are placed inside the handlebar tube (13). The lamp (1) extends the handlebar tip only by 8-12 mm.

Figure 2:
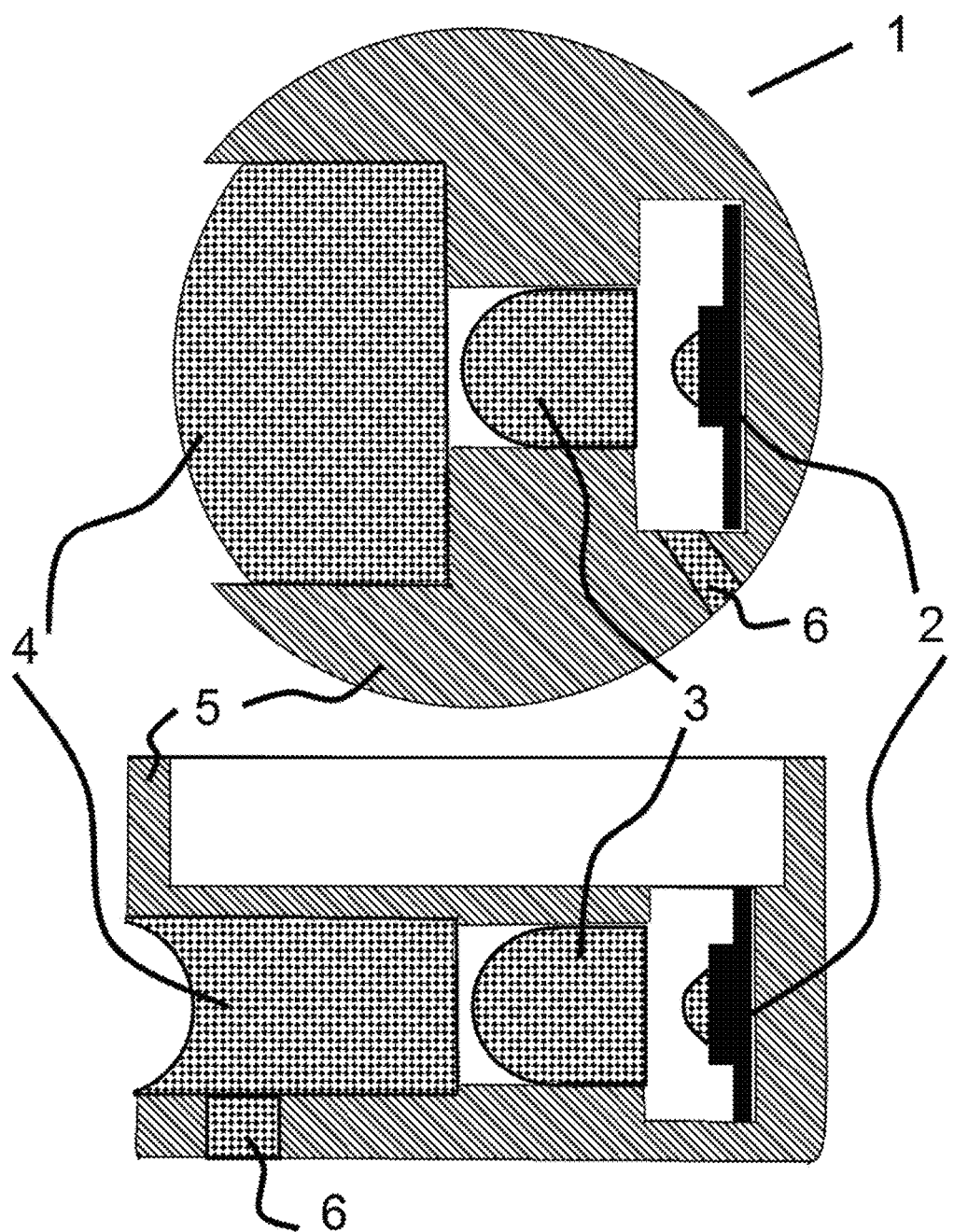
FIG. 2 presents a lamp with one LED and two lenses.

FIG. 2 shows a lens system utilizing only one LED (2) and two lenses (3, 4). The layout allows obtaining a sharply limited light beam for daytime running lights, headlamps or position lamps using a light source, such as a square crystal LED, with a beam that is sharply limited in the vertical plane and sufficiently wide in the horizontal plane. The shapes and corners of the lenses (3, 4) relative to the horizon and to the rear plane of tip, the light source location and its size can be modified depending on the desired beam dispersion. Installing the second light source allows obtaining a beam with a different dispersion pattern. Thus, the beam can be optimized for nighttime conditions (a dipped vertically narrow horizontal beam) or for daytime conditions (a raised vertically wide horizontal beam) by toggling the light sources.

Figure 3:
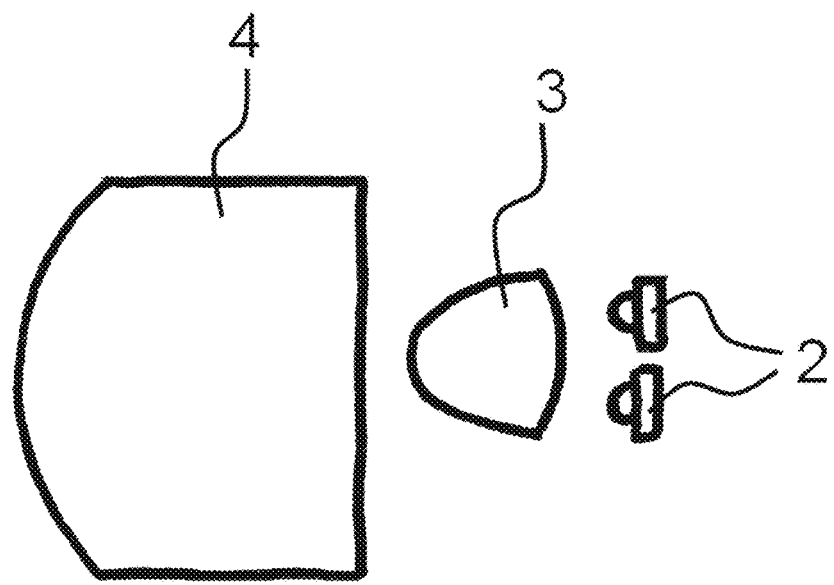
FIG. 3 presents an example of a lamp according to the invention with two LEDs and two lenses.
Figure 4:
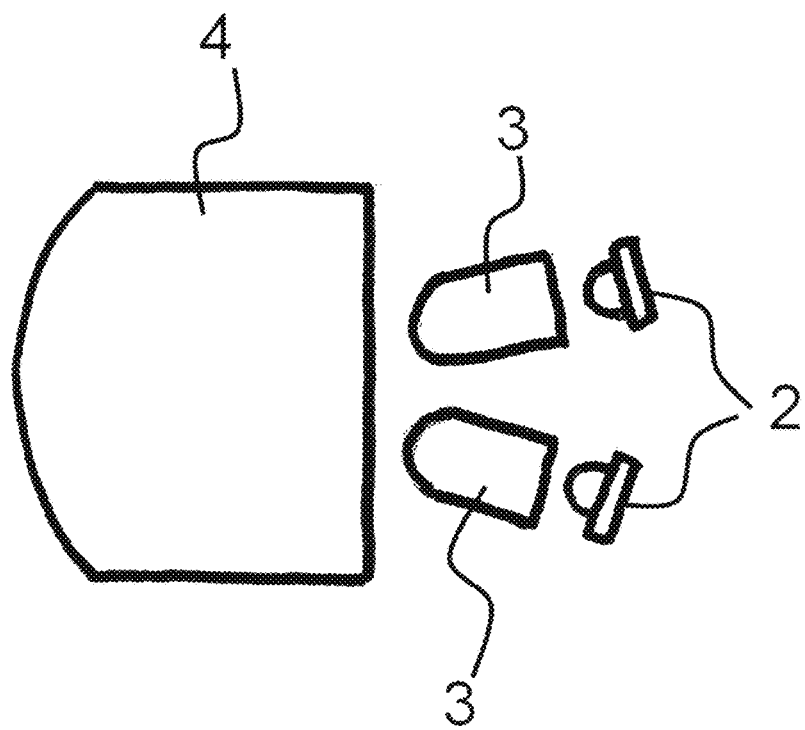
FIG. 4 presents an example of a lamp according to the invention with two LEDs and three lenses.
Figure 5:
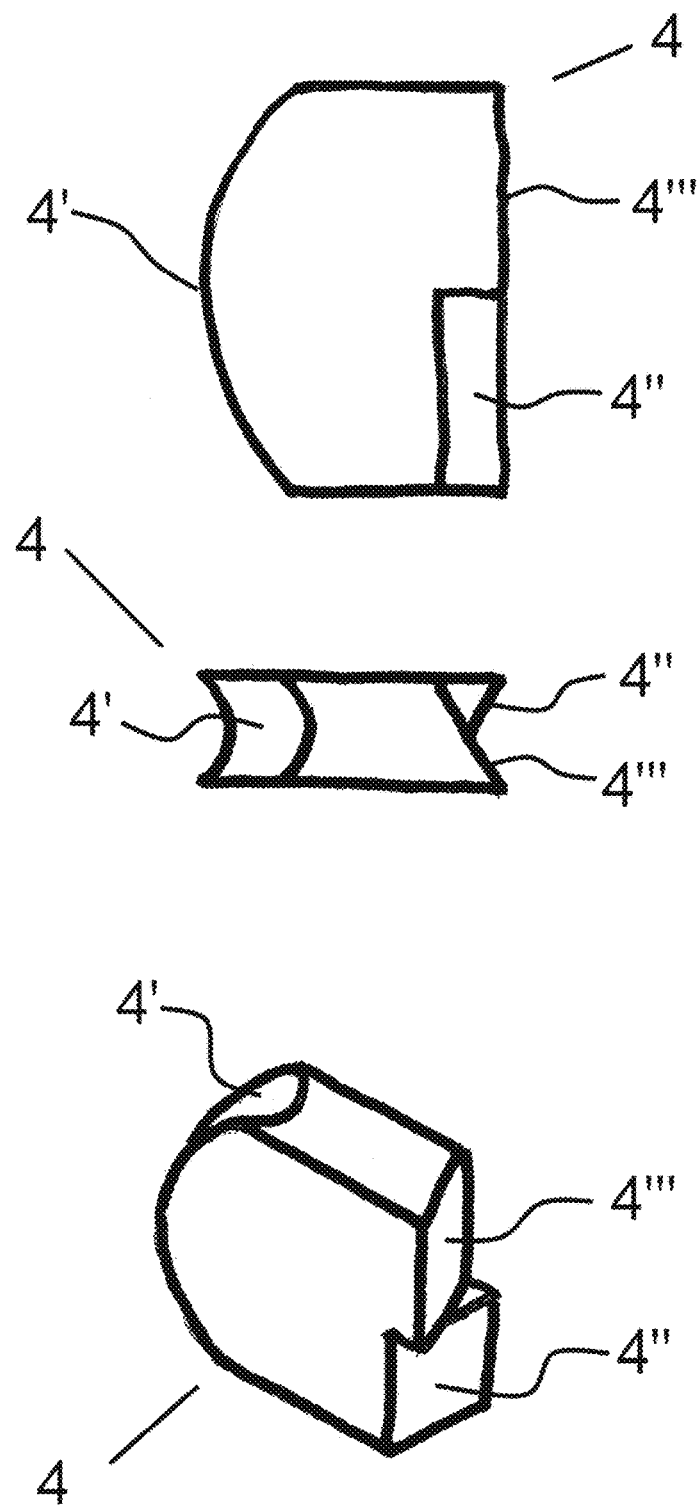
FIG. 5 presents the lens of a lamp according to the invention intended for use with two independent LEDs.
Figure 6:
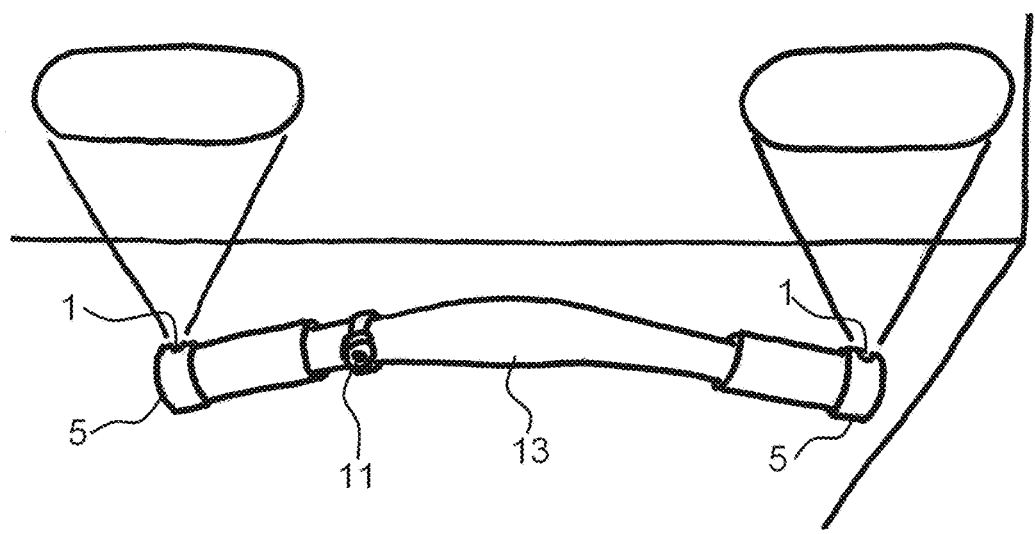
FIG. 6 presents an example of the illumination pattern of the lamp.

FIG. 3 shows an example embodiment with two separate LEDs (2) and two lenses (3, 4); and FIG. 4 shows example embodiment with two separate LEDs (2) and three lenses (3, 4). In both cases, the narrow lens (4) has a special saddle-shaped output surface (4') and at least two different planar areas (4", 4'") on the input surface of the lens (4). Each of at least two planar areas (4", 4'") on the lens (4) input surface deflects the light beam from a corresponding adjacent light source up or down on vertical plane in front of the lamp (1).

The lamp (1) power supply (7), such as a rechargeable battery or a single charge battery, is mounted inside the handlebar tube and can be used for at least one such lamp (1). The number of the said lamps (1) can be two or more, depending on feasibility to install them on the ends of a handlebar and inside the tube thereof or on other tubular elements attached to the handlebar, such as auxiliary handles. All individual lamps can be connected by wires to a single power supply and a single control button or can have separate power supplies and control buttons. The switch (10) is mounted on the outside of the handlebar, where the signal between the switch (10) and the lamp power control circuit (9) is transmitted via magnetic field by means of a magnet (13) on the outside and a reed relay or another magnetic field sensor on the inside. This design of the lamp does not require hole drilling for switch leads.

The main application of the invention is a bicycle lamp, but it may be applied for other types of vehicles and not only for vehicles, but for hand-held lighting devices as well. Although numerous characteristics, advantages, structural details and features have been presented in the description of the invention, the description is provided as an example embodiment of the invention. Particulars of the embodiment can be modified, especially concerning the shape and the size of the members, within the confines of the principles of the invention according to the widest possible definitions of the concepts as used in the claims.

The invention claimed is:

1. A compact flat lamp (1), comprising:
a lamp housing (5) mounted inside a bicycle handlebar tube (13);
a power supply (7);
a lighting control device (9); and
at least one light-emitting diode (LED) (2),
wherein the at least one LED (2) is placed in the lamp housing (5) behind a focusing lens (3), and behind a special narrow lens (4) that additionally deflects light from the at least one LED (2) to achieve a desirable light dissipation pattern, and
wherein the lamp housing is configured to be mounted on an end of the handlebar tube (13).

2. The compact lamp (1) according to claim 1, wherein the control device (9) is an electric circuit (9), configured to be placed inside a hollow of the handlebar tube (13) and connectable via a magnetic contact (10) to a button (11), which is located on the outside of the handlebar tube and is useable for control of the at least one LED (2).

3. The compact lamp (1) according to claim 1, further comprising:
at least one additional light transmitting element (6) built into the lamp housing (5).

4. The compact lamp (1) according to claim 1, wherein at least two LEDs (2) are placed inside the lamp housing (5), behind the said focusing lens (3) and behind the special narrow lens (4), which additionally deflects light from both the at least two LEDs (2).

5. The compact lamp (1) according to claim 4, wherein each of the at least two LEDs (2) inside the lamp housing (5) is placed behind a separate focusing lens (3), each of the separate focusing lenses located behind the special narrow lens (4).

6. The compact lamp (1) according to claim 1, wherein the special narrow lens (4) has a convex-concave saddle-shaped surface.

7. The compact lamp (1) according to claim 1, wherein the special narrow lens (4) has a cylindrical surface.

8. The compact lamp (1) according to claim 1, wherein the special narrow lens (4) has a convex surface.

9. A compact flat lamp (1), comprising:
a lamp housing (5) mounted inside a bicycle handlebar tube (13);
a power supply (7);
a lighting control device (9); and
at least one light-emitting diode (LED) (2),
wherein the at least one lamp LED (2) is placed in the lamp housing (5) behind a focusing lens (3), and behind a special narrow lens (4) that additionally deflects light from the at least one LED (2) to achieve a desirable light dissipation pattern,
wherein the lamp housing is configured to be mounted on an end of the handlebar tube (13), and
wherein the special narrow lens (4) has at least two different planar input surfaces (4", 4'").

10. The compact lamp (1) according to claim 4, wherein each of the at least two LEDs (2) of the lamp (1) can be individually controlled by a switch (11) to operate the lamp as any of a turn indicator, as a daytime running lamp, and as a headlamp at night.

11. The compact lamp (1) according to claim 1, wherein the compact lamp (1) is installed in a tubular device.

12. The compact lamp (1) according to claim 2, wherein at least two LEDs (2) are placed inside the lamp housing (5), behind the said focusing lens (3) and behind the special narrow lens (4), which additionally deflects light from both the at least two LEDs (2).

13. The compact lamp (1) according to claim 3, wherein at least two LEDs (2) are placed inside the lamp housing (5), behind the said focusing lens (3) and behind the special narrow lens (4), which additionally deflects light from both the at least two LEDs (2).

14. The compact lamp (1) according to claim 2, wherein the special narrow lens (4) has a convex-concave saddle-shaped surface.

15. The compact lamp (1) according to claim 3, wherein the special narrow lens (4) has a convex-concave saddle-shaped surface.

16. The compact lamp (1) according to claim 4, wherein the special narrow lens (4) has a convex-concave saddle-shaped surface.

17. The compact lamp (1) according to claim 5, wherein the special narrow lens (4) has a convex-concave saddle-shaped surface.

* * * * *